US011518367B2

United States Patent
Lin et al.

(10) Patent No.: US 11,518,367 B2
(45) Date of Patent: Dec. 6, 2022

(54) TORQUE CONVERTER CONTROL FOR A VARIABLE DISPLACEMENT ENGINE

(71) Applicant: Ford Global Technologies, LLC, Dearborn, MI (US)

(72) Inventors: Steven Lin, Walnut, CA (US); John Eric Rollinger, Troy, MI (US); Adam J. Richards, Canton, MI (US); Justin Cartwright, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 16/680,329

(22) Filed: Nov. 11, 2019

(65) Prior Publication Data

US 2020/0079356 A1 Mar. 12, 2020

Related U.S. Application Data

(62) Division of application No. 15/601,404, filed on May 22, 2017, now Pat. No. 10,543,836.

(51) Int. Cl.
| | |
|---|---|
| *B60W 30/02* | (2012.01) |
| *B60W 10/02* | (2006.01) |
| *B60W 10/06* | (2006.01) |
| *B60W 10/22* | (2006.01) |
| *B60G 17/019* | (2006.01) |
| *B60G 17/016* | (2006.01) |

(Continued)

(52) U.S. Cl.
CPC ......... *B60W 30/025* (2013.01); *B60G 17/016* (2013.01); *B60G 17/0195* (2013.01); *B60G 17/01908* (2013.01); *B60W 10/023* (2013.01); *B60W 10/026* (2013.01); *B60W 10/06* (2013.01); *B60W 10/22* (2013.01); *B60G 2400/102* (2013.01); *B60G 2400/32* (2013.01); *B60G 2400/82* (2013.01); *B60W 2422/10* (2013.01); *B60W 2510/0241* (2013.01); *B60W 2510/22* (2013.01); *B60W 2710/024* (2013.01); *B60W 2710/025* (2013.01); *B60W 2710/223* (2013.01); *B60Y 2300/52* (2013.01); *F02D 17/02* (2013.01)

(58) Field of Classification Search
CPC ............ B60W 30/025; B60W 10/023; B60W 10/026; B60W 10/06; B60W 10/22; B60W 2422/10; B60W 2510/0241; B60W 2510/22; B60W 2710/024; B60W 2710/025; B60W 2710/223; B60G 17/016; B60G 17/01908; B60G 17/0195; B60G 2400/102; B60G 2400/32; B60G 2400/82; B60Y 2300/52; F02D 17/02
USPC .......................................................... 701/37
See application file for complete search history.

(56) References Cited

U.S. PATENT DOCUMENTS

| | | | |
|---|---|---|---|
| 7,288,046 | B2 | 10/2007 | Boone et al. |
| 7,720,587 | B2 | 5/2010 | McDonald et al. |
| 8,146,565 | B2 | 4/2012 | Leone et al. |

(Continued)

*Primary Examiner* — Gertrude Arthur Jeanglaude
(74) *Attorney, Agent, or Firm* — Vincent Mastrogiacomo; McCoy Russell LLP

(57) ABSTRACT

Systems and methods for operating an engine and a torque converter are presented. In one example, slip of a torque converter is adjusted via at least partially closing or opening a torque converter clutch in response to vehicle vibration. The vehicle vibration may be based on road surface conditions and an actual total number of operating cylinders of the engine.

13 Claims, 6 Drawing Sheets

(51) Int. Cl.
*B60G 17/0195* (2006.01)
*F02D 17/02* (2006.01)

(56) References Cited

U.S. PATENT DOCUMENTS

| | | | |
|---|---|---|---|
| 9,827,989 B1* | 11/2017 | Saxman | B60W 30/18 |
| 10,006,379 B2 | 6/2018 | Rollinger et al. | |
| 10,830,169 B1* | 11/2020 | Banker | F02D 13/06 |
| 2009/0164060 A1 | 6/2009 | Fortson et al. | |
| 2010/0174465 A1* | 7/2010 | Gibson | B60W 30/192 |
| | | | 701/70 |
| 2011/0112734 A1 | 5/2011 | Whitney et al. | |
| 2012/0265402 A1 | 10/2012 | Post, II et al. | |
| 2012/0285161 A1* | 11/2012 | Kerns | F01N 13/011 |
| | | | 60/598 |
| 2014/0041626 A1 | 2/2014 | Wilcutts et al. | |
| 2014/0297116 A1 | 10/2014 | Anderson et al. | |
| 2015/0039190 A1 | 2/2015 | Livshiz et al. | |
| 2015/0073674 A1 | 3/2015 | Kelly et al. | |
| 2015/0239451 A1 | 8/2015 | Horgan et al. | |
| 2016/0272031 A1 | 9/2016 | Nedachi | |
| 2017/0370301 A1 | 12/2017 | Srinivasan | |
| 2018/0106201 A1 | 4/2018 | Yuan et al. | |

* cited by examiner

TORQUE CONVERTER CONTROL FOR A VARIABLE DISPLACEMENT ENGINE

CROSS REFERENCE TO RELATED APPLICATION

The present application is a divisional of U.S. Non-Provisional patent application Ser. No. 15/601,404, entitled "TORQUE CONVERTER CONTROL FOR A VARIABLE DISPLACEMENT ENGINE," and filed on May 22, 2017. The entire contents of the above-referenced application are hereby incorporated by reference for all purposes.

FIELD

The present description relates to a system and methods for operating an engine and torque converter during conditions where one or more cylinders of the engine may be temporarily deactivated to improve engine fuel economy. The methods and system provide for ways of providing a desired level of fuel economy and a desired level of vehicle noise.

BACKGROUND AND SUMMARY

A vehicle may also include one or more cylinders of an engine may be temporarily deactivated to improve vehicle fuel economy. The one or more cylinders may be deactivated by ceasing to supply fuel and spark to the deactivated cylinders. Additionally, air flow into and out of the deactivated cylinders may be prevented, or at least significantly reduced, via closing intake and exhaust valves of the deactivated cylinders. The engine may also be mechanically coupled to a transmission that includes a torque converter. The torque converter allows the engine to rotate without the vehicle having to move and without the engine being completely decoupled from the transmission. Further, an impeller of the torque converter may be locked to a turbine of the torque converter to increase driveline efficiency; however, locking the torque converter may increase driveline noise vibration and harshness (NVH). The driveline may be at a higher efficiency when cylinders are deactivated and when the torque converter is locked, but driveline vibrations may be greater than desired during such conditions. Therefore, it may be desirable to provide a method that provides higher levels of driveline efficiency without vehicle occupants having to tolerate undesirable levels of vehicle vibration and noise.

The inventors herein have recognized the above-mentioned limitations and have developed an engine control method, comprising: increasing an actual total number of operating cylinders from a first actual total number of operating cylinders to a second actual total number of operating cylinders via a controller in response to slip of a torque converter exceeding a threshold, the threshold a function of a fuel benefit and a fuel penalty.

By increasing the actual total number of operating cylinders in response to slip of a torque converter exceeding a threshold, the threshold a function of a fuel benefit and a fuel penalty, it may be possible to provide the technical result of operating an engine in a cylinder deactivation mode and controlling torque converter slip such that driveline efficiency is high and vehicle passengers are not disturbed by driveline noise. For example, an eight cylinder engine may change from a four cylinder operating mode to a six or eight cylinder operating mode when torque converter slip exceeds a threshold that indicates that increasing an actual total number of operating cylinders may be more effective to control NVH and operate the driveline efficiently.

The present description may provide several advantages. In particular, the approach may provide improved vehicle fuel economy with reduced NVH. In addition, the approach may reduce the possibility of disturbing occupants of a vehicle while cylinders are deactivated. Further, the approach provides a useful way of resolving whether it is more beneficial to increase slip of a torque converter to improve driveline NVH or activate additional cylinders to improve NVH.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
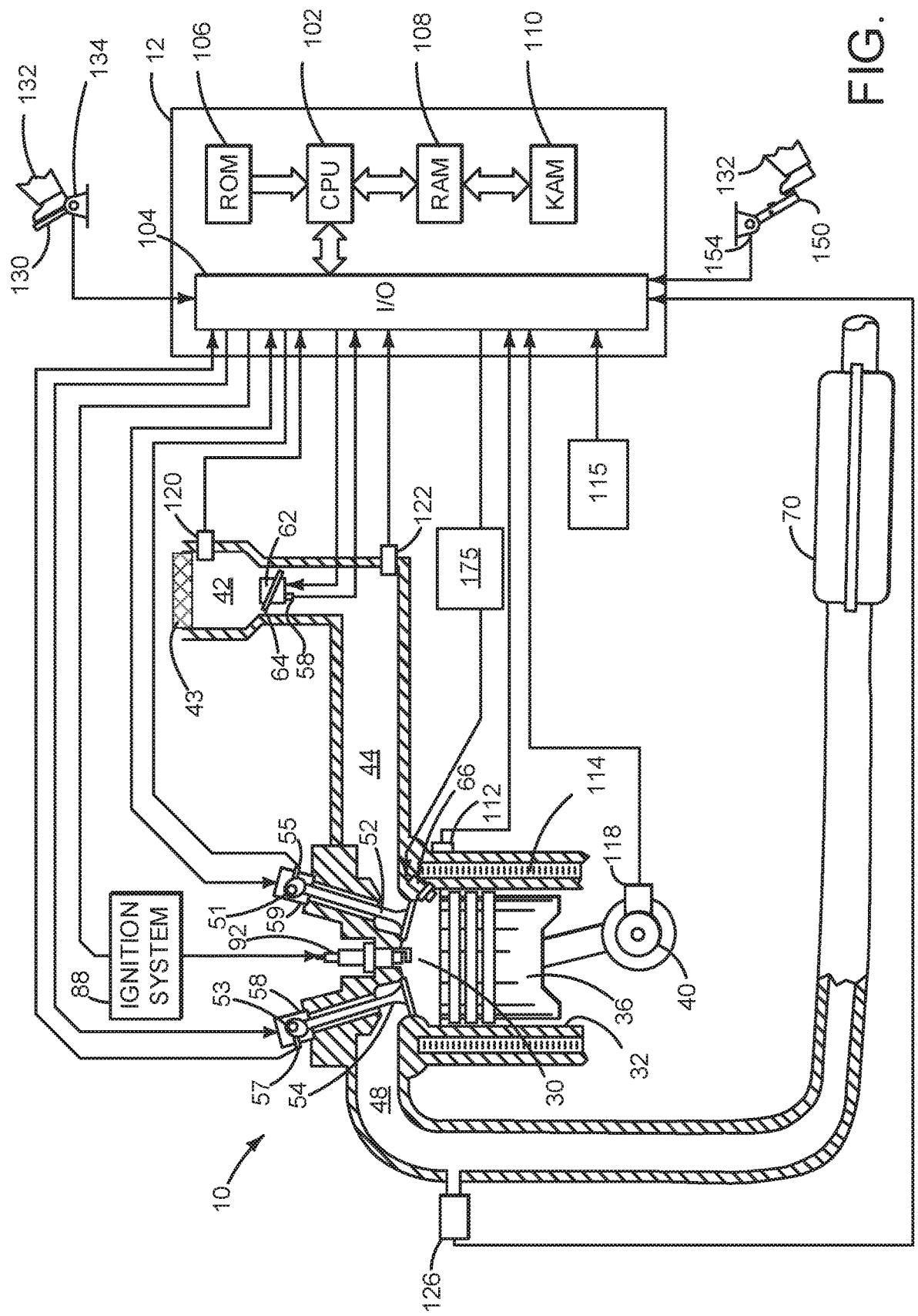
FIG. 1 is a schematic diagram of an engine.
Figure 3:
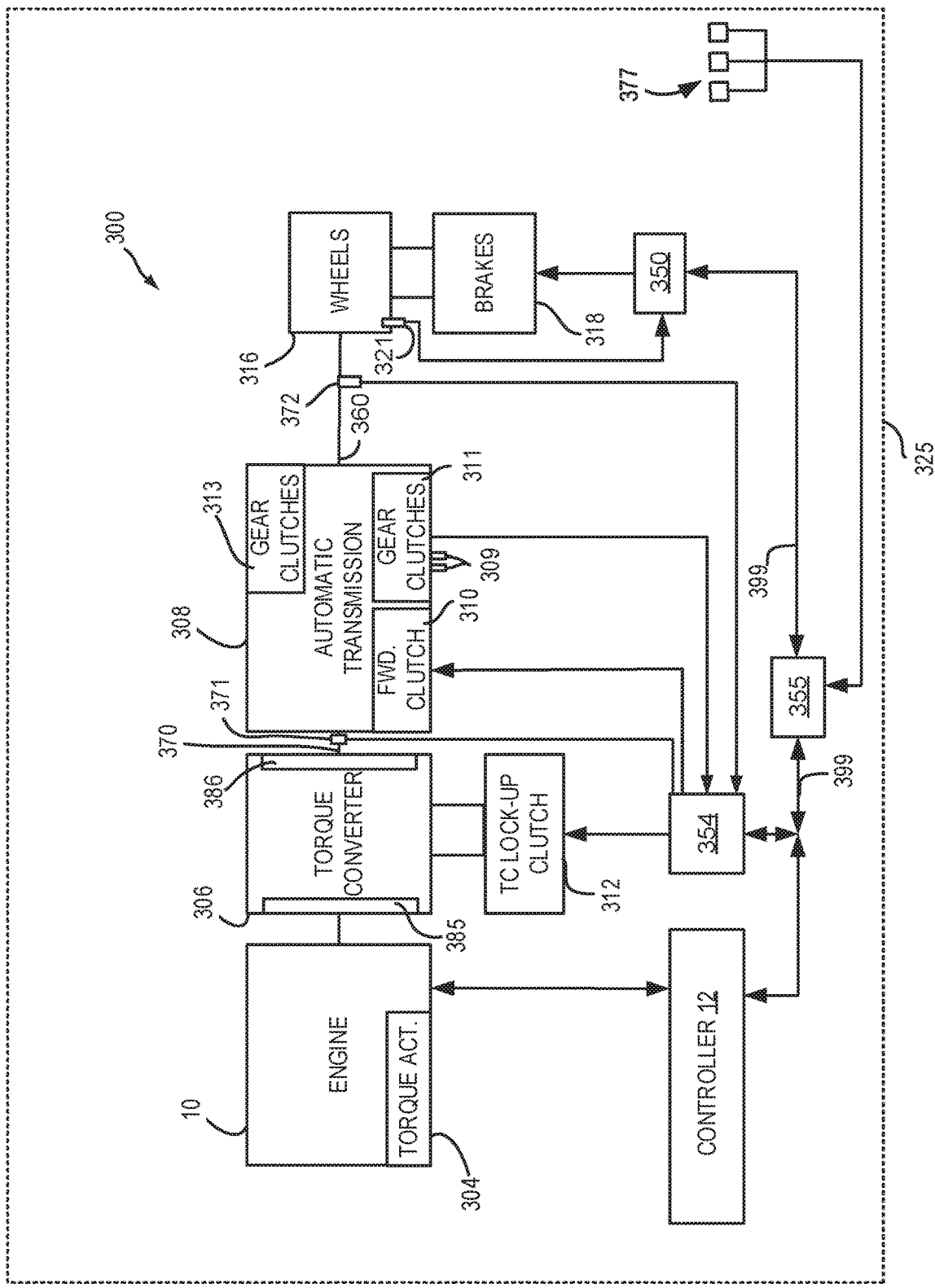
FIG. 3 shows a schematic diagram of an example powertrain or driveline including the engine of FIG. 1.
Figure 4:
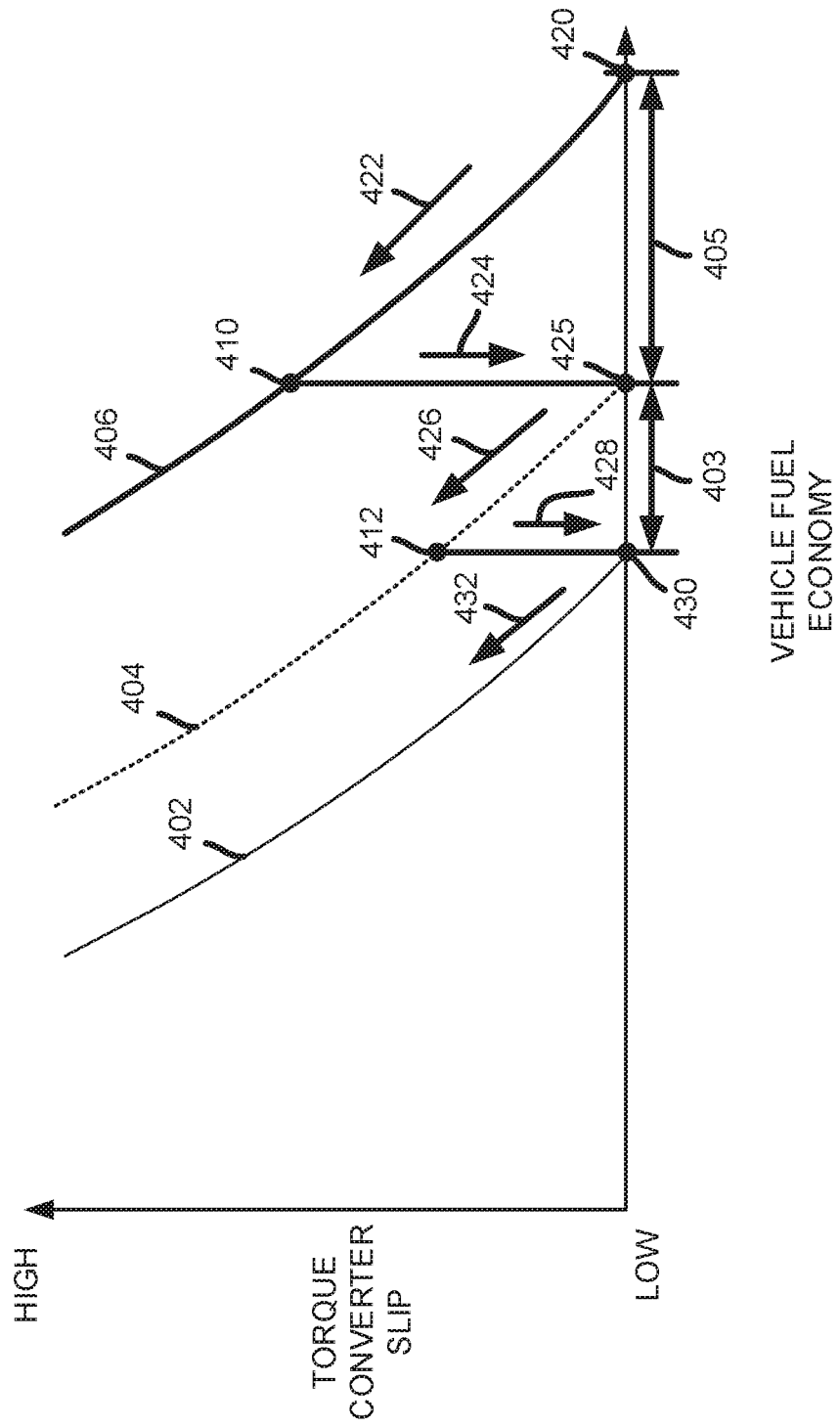
FIG. 4 is a plot of an example way of adjusting a total actual number of active or operating cylinders responsive to torque converter slip.
Figure 5A:
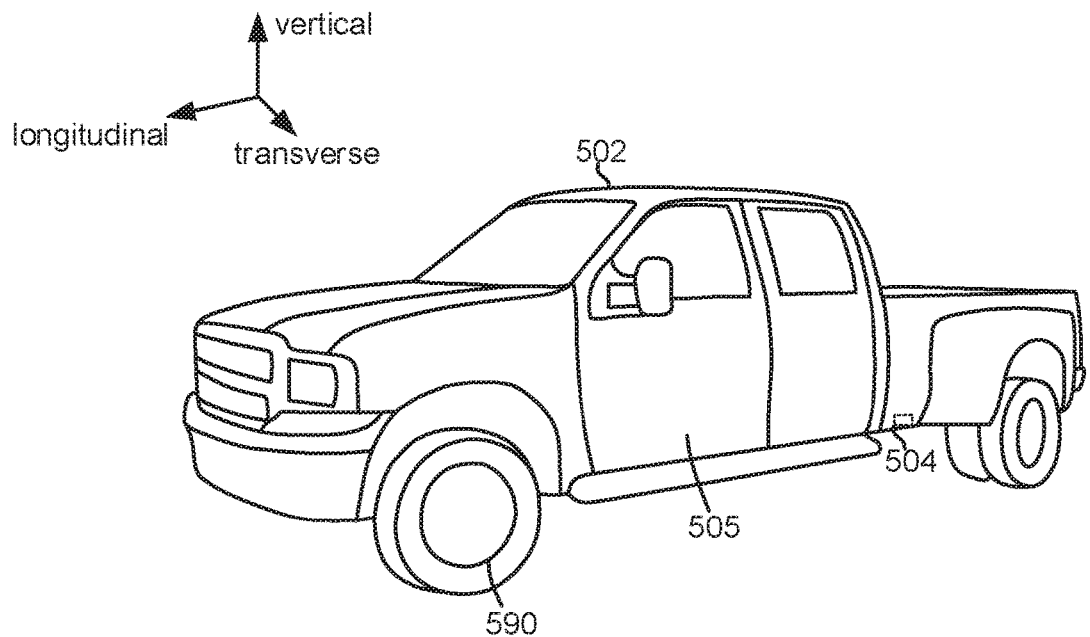
FIGS. 5A-5C show an example vehicle and suspension components.
Figures 5B, 5C:
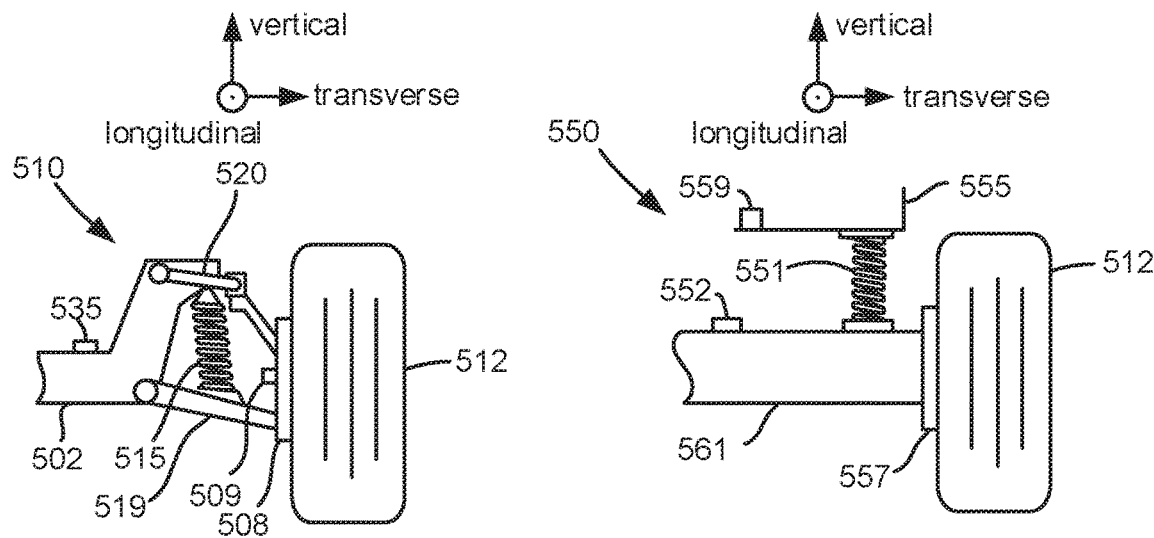

The present description is related to improving engine operation and vehicle drivability during conditions where engine cylinders may be deactivated to improve vehicle fuel efficiency. Cylinders of an engine as shown in FIGS. 1-2B may be selectively deactivated (e.g., not combusting air and fuel) to improve engine fuel efficiency. The engine cylinders may also be reactivated (e.g., combusting air and fuel) to improve engine power output and reduce engine and vehicle chassis vibration. The engine may be included in a vehicle driveline as shown in FIG. 3. The engine cylinders may be activated and deactivated based on torque converter slip as shown in FIG. 4. The engine and vehicle driveline may be incorporated into a vehicle with a suspension as shown in FIGS. 5A-5C. The method of FIG. 6 may adjust engine and transmission operation for a vehicle to improved vehicle fuel efficiency and drivability.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40. Intake valves may be deactivated and held in a closed state via intake valve deactivating mechanism 59. Exhaust valves may be deactivated and held in a closed state via exhaust valve deactivating mechanism 58.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175, which includes a tank and pump. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may receive input from human/machine interface 115 (e.g., pushbutton or touch screen display).

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2A:
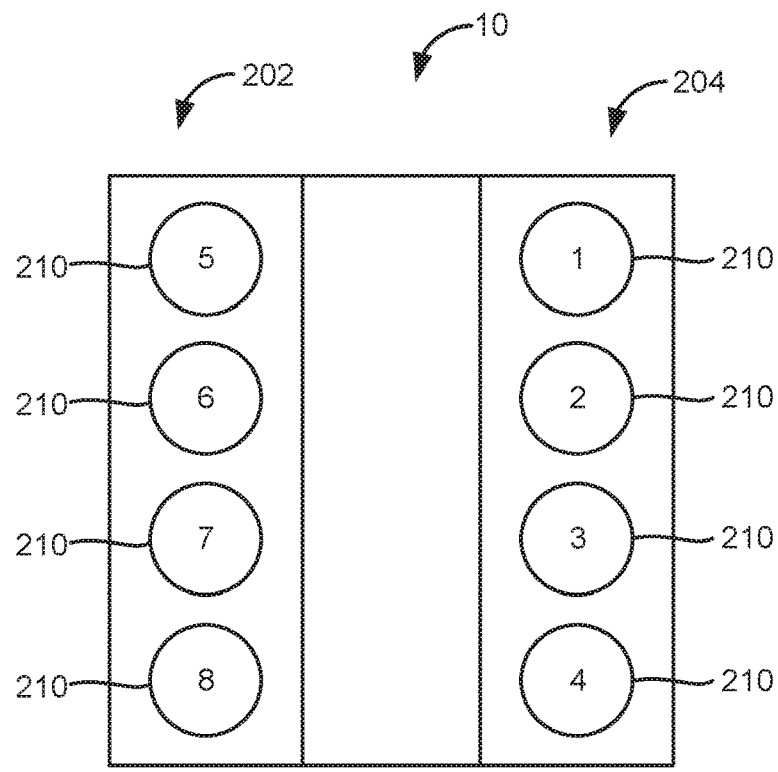
FIGS. 2A and 2B are schematic diagrams of example engine configurations.
Figure 2B:
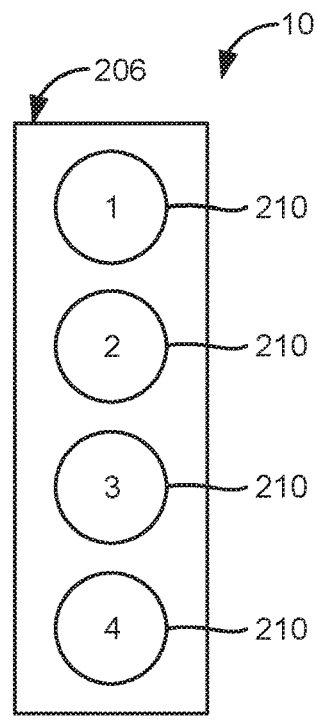

Referring now to FIG. 2A, a first configuration of engine 10 is shown. Engine 10 includes two cylinder banks 202 and 204. First cylinder bank 204 includes cylinders 210 numbered 1-4. Second cylinder bank 202 includes cylinders 210 numbered 5-8. Thus, the first configuration is a V8 engine comprising two cylinder banks. All cylinders operating may be a first cylinder operating mode.

During select conditions, one or more of cylinders 210 may be deactivated via ceasing to flow fuel to the deactivated cylinders. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinders 2, 3, 5, and 8 may be deactivated forming a first pattern of deactivated cylinders and a second cylinder operating mode. Alternatively, cylinders 1, 4, 6, and 7 may be deactivated forming a second pattern of deactivated cylinders and a third cylinder operating mode. In still another example, cylinders 2 and 8 may be deactivated forming a third pattern of deactivated cylinders and a fourth cylinder operating mode. In yet another example, cylinders 3 and 5 may be deactivated forming a fourth pattern of deactivated cylinders and a fifth cylinder operating mode. In this example, five cylinder operating modes are provided; however, additional or fewer cylinder operating modes may be provided. If engine conditions are such that the engine may operate in any of the five cylinder modes described, the engine may be described as having five available cylinder operating modes. In this example, if two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

Referring now to FIG. 2B, a second configuration of engine 10 is shown. Engine 10 includes one cylinder bank 206. Cylinder bank 206 includes cylinders 210 numbered 1-4. Thus, the first configuration is an I4 engine comprising one cylinder bank. All cylinders operating may be a first cylinder operating mode for this engine configuration.

Similar to the first configuration, one or more of cylinders 210 may be deactivated via ceasing to flow fuel to the deactivated cylinders. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinders 2 and 3 may be deactivated forming a first pattern of deactivated cylinders and a second cylinder operating mode. Alternatively, cylinders 1 and 4 may be deactivated forming a second pattern of deactivated cylinders and a third cylinder operating mode. In still another example, cylinder 2 may be deactivated forming a third pattern of deactivated cylinders and a fourth cylinder operating mode. In yet another example, cylinder 3 may be deactivated forming a fourth pattern of deactivated cylinders and a fifth cylinder operating mode. In this example, if engine conditions are such that the engine may operate in any of the five cylinder modes described, the engine may be described as having five available cylinder operating modes. If two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

In still other examples, different cylinder configurations may be provided. For example, the engine may be a V6 engine or a V10 engine. The different engine configurations may also have different numbers of cylinder operating modes.

Referring now to FIG. 3, a block diagram of a vehicle 325 including a powertrain or driveline 300 is shown. The powertrain of FIG. 3 includes engine 10 shown in FIG. 1. Powertrain 300 is shown including vehicle system controller 355, engine controller 12, transmission controller 354, and brake controller 350. The controllers may communicate over controller area network (CAN) 399. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 355 may provide commands to engine controller 12, transmission controller 354, and brake controller 350 to achieve driver input requests and other requests that are based on vehicle operating conditions.

In other examples, the partitioning of controlling powertrain devices may be partitioned differently than is shown in FIG. 3. For example, a single controller may take the place of vehicle system controller 355, engine controller 12, transmission controller 354, and brake controller 350. Alternatively, the vehicle system controller 355 and the engine controller 12 may be a single unit while the transmission controller 354, and the brake controller 350 are standalone controllers.

In this example, powertrain 300 may be powered by engine 10. Further, torque of engine 10 may be adjusted via torque actuator 304, such as a fuel injector, throttle, etc. An engine output torque may be transmitted to impeller 385. Torque converter 306 includes a turbine 386 to output torque to input shaft 370. Input shaft 370 mechanically couples torque converter 306 to automatic transmission 308. Torque converter 306 also includes a torque converter bypass lock-up clutch 312 (TCC). Torque is directly transferred from impeller 385 to turbine 386 when TCC is locked. TCC is electrically operated by controller 12. Alternatively, TCC may be hydraulically locked. In one example, the torque converter may be referred to as a component of the transmission.

When torque converter lock-up clutch 312 is fully disengaged, torque converter 306 transmits engine torque to automatic transmission 308 via fluid transfer between the torque converter turbine 386 and torque converter impeller 385, thereby enabling torque multiplication. In contrast, when torque converter lock-up clutch 312 is fully engaged, the engine output torque is directly transferred via the torque converter clutch to an input shaft 370 of transmission 308. Alternatively, the torque converter lock-up clutch 312 may be partially engaged, thereby enabling the amount of torque directly relayed to the transmission to be adjusted. The transmission controller 354 may be configured to adjust the amount of torque transmitted by torque converter 312 by adjusting the torque converter lock-up clutch in response to various engine operating conditions, or based on a driver-based engine operation request.

Automatic transmission 308 includes gear clutches (e.g., gears 1-10) 311 and forward clutch 310 for activating gears 313 (e.g., gears 1-10). Automatic transmission 308 is a fixed ratio transmission. The gear clutches 311 and the forward clutch 310 may be selectively engaged to change a ratio of an actual total number of turns of input shaft 370 to an actual total number of turns of wheels 316. Gear clutches 311 may be engaged or disengaged via adjusting fluid supplied to the clutches via shift control solenoid valves 309. Torque output from the automatic transmission 308 may also be relayed to wheels 316 to propel the vehicle via output shaft 360. Specifically, automatic transmission 308 may transfer an input driving torque at the input shaft 370 responsive to a vehicle traveling condition before transmitting an output driving torque to the wheels 316. Transmission controller 354 selectively activates or engages TCC 312, gear clutches 311, and forward clutch 310. Transmission controller also selectively deactivates or disengages TCC 312, gear clutches 311, and forward clutch 310.

Further, a frictional force may be applied to wheels 316 by engaging friction wheel brakes 318. In one example, friction wheel brakes 318 may be engaged in response to the driver pressing his foot on a brake pedal (not shown) and/or in response to instructions within brake controller 350. Further, brake controller 350 may apply brakes 318 in response to information and/or requests made by vehicle system controller 355. In the same way, a frictional force may be reduced to wheels 316 by disengaging wheel brakes 318 in response to the driver releasing his foot from a brake pedal, brake controller instructions, and/or vehicle system controller instructions and/or information. For example, vehicle brakes may apply a frictional force to wheels 316 via controller 350 as part of an automated engine stopping procedure.

In response to a request to accelerate vehicle 325, vehicle system controller may obtain a driver demand torque or power request from an accelerator pedal or other device. Vehicle system controller 355 then allocates the requested driver demand torque to the engine. Vehicle system controller 355 requests the engine torque from engine controller 12. If engine torque is less than a transmission input torque limit (e.g., a threshold value not to be exceeded), the torque is delivered to torque converter 306 which then relays at least a fraction of the requested torque to transmission input shaft 370. Transmission controller 354 selectively locks torque converter clutch 312 and engages gears via gear clutches 311 in response to shift schedules and TCC lockup schedules that may be based on input shaft torque and vehicle speed.

Accordingly, torque control of the various powertrain components may be supervised by vehicle system controller 355 with local torque control for the engine 10, transmission 308, and brakes 318 provided via engine controller 12, transmission controller 354, and brake controller 350.

As one example, an engine torque output may be controlled and/or limited by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 354 receives transmission input shaft position via position sensor 371. Transmission controller 354 may convert transmission input shaft position into input shaft speed via differentiating a signal from position sensor 371 or counting a number of known angular distance pulses over a predetermined time interval. Transmission controller 354 may receive transmission output shaft torque from torque sensor 372. Alternatively, sensor 372 may be a position sensor or torque and position sensors. If sensor 372 is a position sensor, controller 354 may count shaft position pulses over a predetermined time interval to determine transmission output shaft velocity. Transmission controller 354 may also differentiate transmission output shaft velocity to determine transmission output shaft acceleration. Transmission controller 354, engine controller 12, and vehicle system controller 355, may also receive addition transmission information from sensors 377, which may include but are not limited to vehicle situational awareness sensors (e.g., cameras, microphones, and range detecting systems including radar, laser, and sonic transmitting and sensing devices), transmission hydraulic pressure sensors (e.g., gear clutch fluid pressure sensors), and ambient temperature sensors.

Brake controller 350 receives wheel speed information via wheel speed sensor 321 and braking requests from vehicle system controller 355. Brake controller 350 may also receive brake pedal position information from brake pedal sensor 154 shown in FIG. 1 directly or over CAN 399. Brake controller 350 may provide braking responsive to a wheel torque command from vehicle system controller 355. Brake controller 350 may also provide anti-skid and vehicle stability braking to improve vehicle braking and stability.

Thus, the system of FIGS. 1-3 provides for a vehicle system, comprising: an accelerometer coupled to a vehicle; an engine coupled to the vehicle; and a controller including executable instructions stored in non-transitory memory to adjust slip of a torque converter in response to a frequency of vertical acceleration of a mass of a vehicle's suspension and a power of vertical acceleration of the mass of the vehicle's suspension. The system includes where adjusting slip of the torque converter includes at least partially releasing a torque converter clutch. The system includes where adjusting slip of the torque converter includes at least partially closing a torque converter clutch. The system includes where the accelerometer is coupled to an unsprung vehicle suspension component. The system further comprises additional instructions to adjust an actual total number of operating cylinders in response to the frequency of vertical acceleration of the mass. The system includes where adjusting slip of the torque converter in response to the frequency includes decreasing slip of the torque converter in response to the frequency increasing.

Referring now to FIG. 4, a plot of a prophetic example way of adjusting an actual total number of activated or operating engine cylinders (e.g., cylinders combusting air and fuel) and an actual total number of deactivated or not operating engine cylinders is shown. The plot represents a way of controlling or operating a driveline at a constant driver demand torque and vehicle speed to simplify the concept for presentation, although the method may be extended to a wide range of vehicle speeds and engine loads.

The vertical axis represents torque converter slip (e.g., a difference between torque converter impeller speed and torque converter turbine speed) and torque converter slip increases in the direction of the vertical axis arrow. Torque converter efficiency may decrease as torque converter slip increases. Torque converter slip may be reduced via at least partially closing a torque converter clutch. By at least partially closing the torque converter clutch, at least a portion of a torque difference between the torque converter impeller and the torque converter turbine may be transferred between the torque converter impeller and the torque converter turbine via a friction element (e.g., the torque converter clutch). Conversely, torque converter slip may be increased via at least partially opening the torque converter clutch so that less torque may be transferred between the torque converter impeller and the torque converter turbine via the torque converter clutch. The horizontal axis represents vehicle fuel economy and vehicle fuel economy increases from the left side of the figure to the right side of the figure. Curve 402 represents vehicle fuel economy when the vehicle is operating with its full complement of cylinders being active or operating (e.g., eight cylinders), a third actual total number of active or operating engine cylinders. Curve 404 represents vehicle fuel economy when the vehicle is operating with fewer than its full complement of cylinders being active and operating (e.g., six cylinders), a second actual total number of active or operating engine cylinders. Curve 406 represents vehicle fuel economy when the vehicle is operating with fewer than its full complement of cylinders being active and operating (e.g., four cylinders), a first actual total number of active or operating engine cylinders. The actual total number of active engine cylinders providing curve 406 is fewer than the actual total number of active engine cylinders providing curve 404. Further, the actual total number of active engine cylinders providing curve 404 is fewer that the actual total number of active engine cylinders providing curve 402.

Thus, it may be observed that at a particular vehicle speed and load, operating the engine with fewer cylinders to provide a desired driver demand torque reduces vehicle fuel consumption. Further, activating additional engine cylinders decreases vehicle fuel economy. By operating the engine with fewer active cylinders, the efficiency of operating cylinders may be increased and engine pumping losses may be reduced. This is shown by curve 402 being to the left of curve 404 and by curve 404 being to the left of curve 406. However, because engine cylinders fire or combust less often at a given engine speed as compared to when the engine is operating with a greater number of active cylinders at the same engine speed, engine noise and vibration may increase. The increased engine noise and vibration may be transferred to the vehicle chassis where vehicle occupants may notice it. Less noise and vibration may be transferred to the vehicle chassis if the transmission's torque converter is allowed to slip, but increased torque converter slip reduces vehicle fuel efficiency as may be observed by the way curves 402, 404, and 406 angle toward the vertical axis, thereby indicating a reduction in vehicle fuel economy as torque converter slip increases. As such, the present description provides a way of determining how many cylinders should be activated and what amount of torque converter slip may be provided to operate the vehicle efficiently and with less possibility of disturbing vehicle passengers considering the fuel economy benefits of deactivating cylinders and the fuel economy penalty of increasing torque converter slip to reduce vehicle NVH.

Leader 405 shows a distance between curve 406 and curve 404. The distance represents a vehicle fuel economy benefit of operating the vehicle with a first actual total number of active cylinders (e.g., curve 406) and operating the vehicle with a second actual total number of active cylinders (e.g., curve 404) when the torque converter clutch is locked. The amount of torque converter slip at the horizontal axis is substantially zero (e.g., within 20 RPM of zero slip or torque converter impeller speed is within 20 RPM of torque converter turbine speed when the torque converter clutch is fully closed). Similarly, leader 403 shows a distance between curve 402 and curve 404. The distance represents a vehicle fuel economy benefit of operating the vehicle with a second actual total number of active cylinders (e.g., curve 404) and operating the vehicle with a third actual total number of active cylinders (e.g., curve 402) when the torque converter clutch is locked. Thus, to achieve maximum vehicle fuel economy, it may be desirable to operate the engine during at the present driver demand torque and vehicle speed at the operating conditions of point 420, where the actual total number of active engine cylinders corresponds to those describing curve 406 and a fully closed torque converter.

Vehicle passengers may be disturbed by operating the vehicle with the actual total number of active engine cylinders represented by curve 406 when the vehicle is traveling on smooth road since road noise is low and road noise may not be sufficient to mask engine and driveline NVH produced via operating the engine with a fewer actual total number of active engine cylinders. However, vehicle passengers may have fewer tendencies to notice NVH emanating from the driveline if torque converter slip is increased in the direction indicated by arrow 422. Thus, arrow 422 indicates a fuel economy penalty associated with reducing driveline and vehicle NVH via torque converter slip. Conversely, vehicle passengers may have fewer tendencies to notice NVH emanating from the driveline during similar conditions if the driveline is operated at point 420 on rough roads where road noise may mask driveline noise.

Different roads may have different levels of road noise depending on the road material (e.g., concrete, asphalt, or gravel) and road surface conditions (e.g., bumps, discontinuities, etc.). Therefore, it may be desirable to adjust torque converter slip to vary from point 420 to point 410 depending on conditions of the road being driven upon by the vehicle. However, increasing torque converter slip may provide diminishing returns in terms of vehicle fuel economy to the point where increasing torque converter slip out weighs vehicle fuel economy advantages of operating the engine with fewer engine cylinders. Consequently, operating point 410 represents a threshold where the actual total number of active engine cylinders may be increased and the actual total number of available cylinder modes may be decreased when further driveline NVH reduction is desired due to road conditions and/or vehicle vibrations. Operating point or threshold 410 also indicates where the fuel benefit of operating the engine with fewer cylinders is depleted by the fuel penalty of increasing torque converter slip via the trajectory from point 420 to point 410. Thus, threshold 410 is a function of or based on the fuel benefit 405 and the fuel penalty between point 420 and point 410. Arrow 424 shows that the engine operating state may change from operating the engine with fewer cylinders to a greater number of cylinders to further reduce driveline and vehicle NVH. Thus, if it may be desirable to take additional actions to reduce the possibility of disturbing vehicle passengers as a result of driveline NVH, additional cylinders may be activated so that the engine moves from point 410 where fewer engine cylinders are active to point 425 where a greater actual total number of engine cylinders are activated. Further, the amount of torque converter slip is reduced when the driveline changes from operating conditions at 410 to operating conditions at 425. As such, the fuel economy penalty caused by increasing torque converter slip above the level shown at point 410 may be mitigated by changing driveline operating conditions of point 425.

If road conditions change further, such as the vehicle begins traveling on a smoother road (e.g., a brushed concrete road) after traveling on a rougher road (e.g., a gravel road), driveline NVH may be further reduced to make it less apparent to vehicle passengers by increasing torque converter slip while the engine operates with an active total number of cylinders corresponding to curve 404. In particular, driveline operating conditions may be adjusted via adjusting torque converter slip as indicated by arrow 426. If road conditions change sufficiently so that torque converter slip is adjusted to the level of operating point 412, additional engine cylinders may be activated because reducing NVH via further increasing torque converter slip becomes less fuel efficient than increasing the actual total number of active cylinders and reducing the torque converter slip to the conditions shown at point 430. Thus, the vehicle operating conditions may be adjusted from point 412 to point 430 as indicated by arrow 428. Operating point or threshold 412 also indicates where the fuel benefit of operating the engine with fewer cylinders (e.g., curve 404) is depleted by the fuel penalty of increasing torque converter slip via the trajectory from point 425 to point 415. Thus, threshold 412 is a function of or based on the fuel benefit 403 and the fuel penalty between point 425 and point 412. If additional driveline adjustments are desirable to reduce vehicle occupant's exposure to driveline NVH, torque converter slip may be increased in the direction of arrow 432.

Thus, operating points 420, 410, 425, 412, and 430 correspond to amounts of vehicle NVH that may be desired for select vehicle operating conditions, such as operating the vehicle in a cylinder deactivation mode on a smoother or rougher road. The driveline operating conditions may be adjusted so that the driveline operates at the operating points or between the operating points along curves 406, 404, and 402 responsive to vehicle operating conditions, such as road surface conditions. Further, by considering fuel benefits of operating fewer or more engine cylinders and increasing or decreasing driveline efficiency and fuel economy via torque converter slip, driveline NVH may be made suitable for road surface conditions so that vehicle fuel economy may be at desirable levels even if driveline NVH is reduced to accommodate road surface conditions.

Referring now to FIG. 5A, an example vehicle 502 in which engine 10 may reside is shown. Vehicle 502 includes a three axis accelerometer 504 that may sense sprung chassis vertical acceleration, longitudinal acceleration, and transverse acceleration. Vertical, longitudinal, and transverse directions are indicted via the illustrated coordinates. Sprung chassis components are components that are supported via suspension springs. Thus, body 505 is a sprung mass while wheel 590 is an unsprung mass. FIGS. 5B and 5C show additional examples of sprung and unsprung masses.

FIG. 5B shows an example chassis suspension 510 for vehicle 502 or a similar vehicle. Tire 512 is mounted to a wheel (not shown) and the wheel is mounted to hub 508. Hub 508 is mechanically coupled to lower control arm 519 and upper control arm 520. Upper control arm 520 and lower control arm 519 may pivot about chassis support 502, which may be part of the vehicle's body. Spring 515 is coupled to chassis support 502 and lower control arm 519 such that spring 515 supports chassis support 502. Hub 508, upper control arm 520, and lower control arm 519 are unsprung since they are not supported by spring 515 and they move according to a surface of the road the vehicle is traveling on. A damper (not shown) may accompany spring 515 to provide a second order system. Accelerometer 509 may sense vertical acceleration of unsprung chassis components, whereas accelerometer 535 may sense vertical acceleration of sprung chassis components. Accelerometer 509 may provide a more direct indication of how unsprung chassis components are responding to the road surface. Accelerometer 535 may provide an indication of how sprung chassis components respond to road surface conditions that reach sprung chassis components. Further, accelerometer 535 may provide an indication of engine vibration related to cylinder deactivation that reaches sprung chassis components and that may reach vehicle occupants.

Output of accelerometer 509 may provide an improved basis for determining how much road related noise vehicle occupants may observe due to motion of unsprung chassis components and tire noise as compared to output of accelerometer 435, which senses acceleration of sprung mass. This may be especially true if suspension springs and/or dampeners have been replaced with different components or if they are in degraded condition. Output of accelerometer 535 may sense engine vibration and accelerations that may not be inferred or sensed by accelerometer 509 due to suspension springs and dampeners.

FIG. 5C shows another example chassis suspension 550 for vehicle 502 or a similar vehicle. Tire 512 is mounted to a wheel (not shown) and the wheel is mounted to hub 557. Hub 557 is mechanically coupled to axle 561. Spring 551 is coupled to chassis 555 and axle 561. Hub 508 and axle 561 are unsprung since they are not supported by spring 551 and they move according to a surface of the road the vehicle is traveling on. A damper (not shown) may accompany spring 551 to provide a second order system. Accelerometer 552 may sense vertical acceleration of unsprung chassis components, whereas accelerometer 559 may sense vertical acceleration of sprung chassis components. Accelerometer 552 may provide a more direct indication of how unsprung chassis components are responding to the road surface. Accelerometer 559 may provide an indication of how sprung chassis components respond to road surface conditions that reach sprung chassis components. Further, accelerometer 559 may provide an indication of engine vibration related to cylinder deactivation that reaches sprung chassis components and that may reach vehicle occupants.

Output of accelerometer 552 may provide an improved basis for determining how much road related noise vehicle occupants may observe due to motion of unsprung chassis components and tire noise as compared to output of accelerometer 559, which senses acceleration of sprung mass. This may be especially true if suspension springs and/or dampeners have been replaced with different components or if they are in degraded condition. Output of accelerometer 559 may sense engine vibration and accelerations that may not be inferred or sensed by accelerometer 552 due to suspension springs and dampeners.

Figure 6:
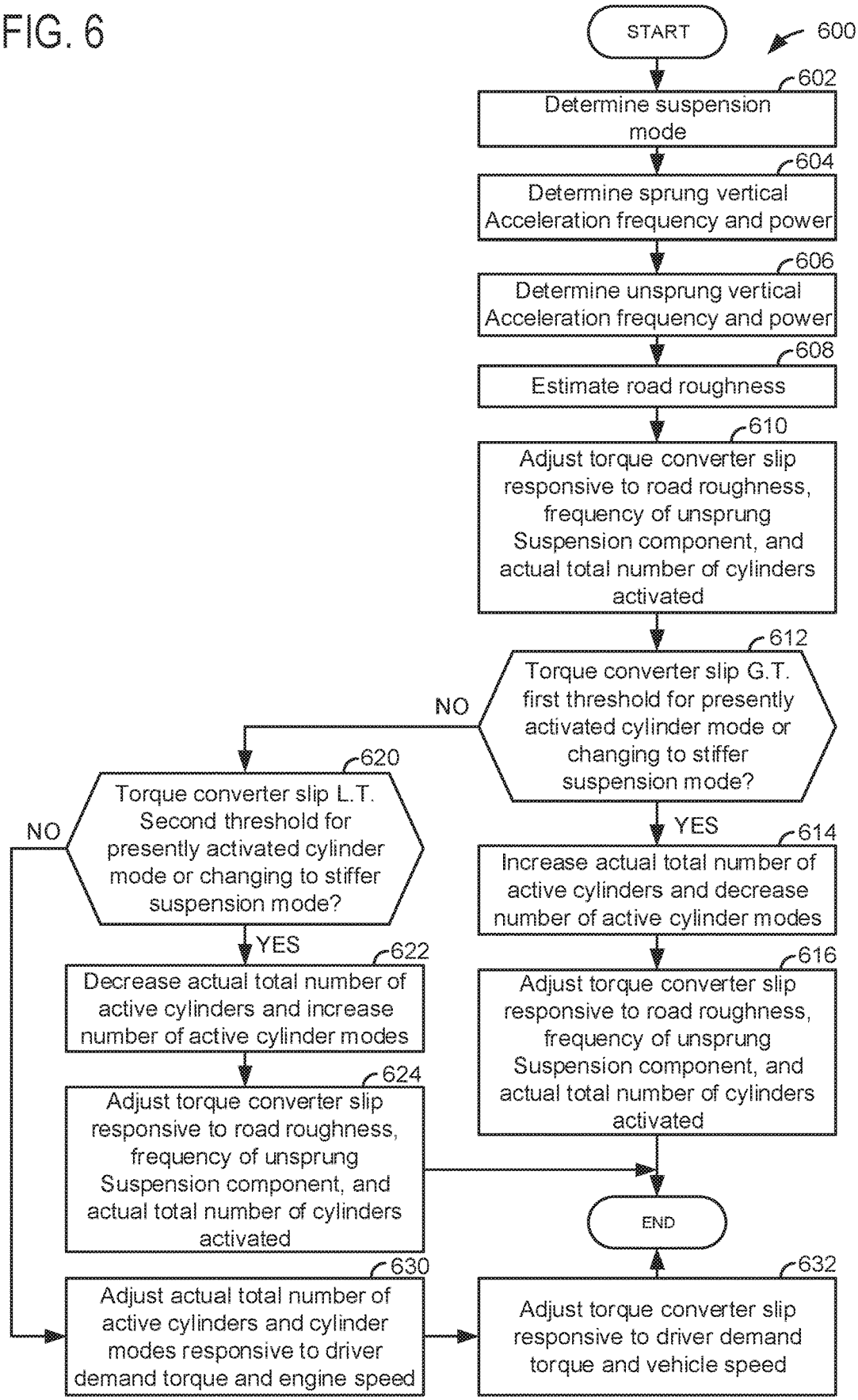
FIG. 6 shows a flow chart of an example method for controlling vehicle driveline.

Referring now to FIG. 6, an example flow chart for a method for operating a vehicle driveline is shown. The method of FIG. 6 may be incorporated into and may cooperate with the system of FIGS. 1-3. Further, at least portions of the method of FIG. 6 may be incorporated as executable instructions stored in non-transitory memory while other portions of the method may be performed via a controller transforming operating states of devices and actuators in the physical world.

At 602, method 600 determines a mode of the vehicle's suspension. In one example, the vehicle may have two or more modes including track (e.g. stiff or non-compliant suspension), sport (e.g., intermediate stiffness suspension), and touring (e.g., compliant suspension). The suspension mode may be determined via a user input device. Method 600 proceeds to 604.

At 604, method 600 determines vertical acceleration frequency and power of a sprung vehicle mass such as a chassis component or body component. The vertical acceleration frequency may be determined via applying a Fourier transform on an output signal of an accelerometer residing on a sprung vehicle component. The Fourier transform may be expressed as:

$$y_s = \sum_{k=0}^{N-1} \omega^{ks} x_{k+1}$$

where $\omega = e^{-2\pi i/n}$, k and s are indices, and x is the signal sample. The signal power may be determined from output of a vertical accelerometer and the following equation:

$$P = \frac{1}{N} \sum_{n=0}^{N-1} x^2[n]$$

where P is the signal power, N is the number of samples, x[n] is the value of the sample at sample n. Method 600 proceeds to 606.

At 606, method 600 determines vertical acceleration frequency and power of an unsprung vehicle mass such as a chassis component or body component (e.g., a wheel hub or suspension control arm). The vertical acceleration frequency may be determined via applying a Fourier transform on an output signal of an accelerometer residing on an unsprung vehicle component. Signal power and frequency are determined via signal power and Fourier transforms described at 604. Method 600 proceeds to 608.

At 608, method 600 estimates road roughness. In one example, method 600 estimates road roughness based on output of a three axis accelerometer. In particular, averages or integrated values of vertical acceleration, longitudinal acceleration, and transverse acceleration over a predetermined time are summed to provide a single value that provides an indication of road roughness. The vertical, longitudinal, and transverse accelerations may be weighted to increase or decrease influence of the respective axis via weighting factors for each of the respective axis. Further, the estimate of road roughness is modified in response to the suspension mode the vehicle is operating in. In one example, the road roughness may be determined via the following equation:

$$RR = Sm((Pv \cdot W_1) + (Pl \cdot W_2) + (Pt \cdot W_3))$$

where RR is the road roughness, Sm is a multiplier for suspension mode, Pv is the power output from the vertical accelerometer, Pl is the power output from the longitudinal accelerometer, Pt is the power output from the transverse accelerometer, $W_1$ is a weighting factor for the vertical accelerometer, $W_2$ is a weighting factor for the longitudinal accelerometer, and $W_3$ is a weighting factor for the transverse accelerometer. The value of Sm may be different for the different suspension modes such that changing the suspension mode may cause the actual total number of active cylinder modes to increase by increasing the road roughness value. For example, a sport suspension mode may have a higher damping ratio than a touring suspension mode. Therefore, the value of Sm may be adjusted so that the road roughness value increases for operating the vehicle in sport suspension mode. Consequently, changing the vehicle's suspension mode may increase or decrease an actual total number of available cylinder modes depending on the road being driven on by the vehicle. Method 600 proceeds to 610 after estimating road roughness.

At 610, method 600 adjusts torque converter slip responsive to road roughness, frequencies of unsprung and unsprung suspension components, and the actual total number of activated engine cylinders. In one example as shown in FIG. 4, torque converter slip may be increased by at least partially opening a torque converter clutch in response to the vehicle moving from traveling on a rough road to traveling on a smoother road so that driveline NVH may be less noticeable to vehicle occupants while the vehicle travels on a smoother road. Conversely, torque converter slip may be decreased by at least partially closing a torque converter clutch in response to the vehicle moving from traveling on a smoother road to traveling on a rougher road so that vehicle fuel economy may be increased when driveline NVH may be less noticeable to vehicle occupants. Additionally, torque converter slip may be adjusted responsive to frequencies of unsprung and sprung vehicle suspension components. For example, torque converter slip may be adjusted in response to frequencies of sprung or unsprung vehicle suspension components approaching harmonics of an engine firing frequency so that chassis vibrations may not compound driveline NVH. Torque converter slip may also be adjusted in response to the actual total number of active engine cylinders as described in FIG. 4. For example, if the actual total number of active engine cylinders is increased, torque converter slip may be reduced for a given engine speed and load. Method 600 proceeds to 612.

At 612, method 600 judges if torque converter slip is greater than (G.T.) a first threshold for the presently activated cylinder mode and actual total number of activated engine cylinders or if the vehicle suspension is changed from a stiffer suspension mode to a more compliant suspension mode. In one example, the first threshold is based on or a function of several parameters including a desired level of driveline NVH, which may be based on road surface conditions, vehicle fuel economy benefits of operating the vehicle with a fewer total activated engine cylinders, and vehicle fuel economy penalties of increasing torque converter slip as discussed with regard to FIG. 4. If method 600 judges that torque converter slip is greater than the first threshold for the presently activated cylinder mode and actual total number of activated engine cylinders, the answer is yes and method 600 proceeds to 614. Otherwise, the answer is no and method 600 proceeds to 620.

At 614, method 600 increases the actual total number of active engine cylinders and decreases the actual total number of active cylinder modes. FIG. 4 shows such operation moving from operating point 410 to operating point 425 and moving from operating point 412 to operating point 430. By increasing the actual total number of active engine cylinders, driveline NVH may be reduced efficiently while reducing driveline NVH responsive to road conditions and vehicle passenger driveline NVH expectations. Method 600 proceeds to 616.

At 616, method 600 adjusts torque converter slip responsive to road roughness, frequency of sprung and unsprung vehicle suspension components, and the actual total number of newly activated engine cylinders. Method 600 adjusts torque converter slip as described at 610 responsive to the newly activated cylinders. Method 600 proceeds to exit.

At 620, method 600 judges if torque converter slip is less than (L.T.) a second threshold for the presently activated cylinder mode and actual total number of activated engine cylinders or if the vehicle suspension is changed from a more compliant suspension mode to a more stiffer suspension mode. In one example, the second threshold is based on or a function of several parameters including a desired level of driveline NVH, which may be based on road surface conditions, vehicle fuel economy benefits of operating the vehicle with a fewer total activated engine cylinders, and vehicle fuel economy penalties of increasing torque converter slip as discussed with regard to FIG. 4. Operating point 425 is an example of a second threshold associated with curve 404. If method 600 judges that torque converter slip is less than the second threshold for the presently activated cylinder mode and actual total number of activated engine cylinders, the answer is yes and method 600 proceeds to 622. Otherwise, the answer is no and method 600 proceeds to 630.

At 622, method 600 decreases the actual total number of active engine cylinders and increases the actual total number of active cylinder modes. FIG. 4 shows such operation moving from operating point 425 to operating point 410 and moving from operating point 430 to operating point 412. By decreasing the actual total number of active engine cylinders, driveline NVH may be increased during conditions where it may be less noticeable so that vehicle fuel efficiency may be improved while meeting vehicle passenger driveline NVH expectations. Method 600 proceeds to 624.

At 624, method 600 adjusts torque converter slip responsive to road roughness, frequency of sprung and unsprung vehicle suspension components, and the actual total number of newly deactivated engine cylinders (e.g., fewer active engine cylinders). Method 600 adjusts torque converter slip as described at 610 responsive to the newly deactivated cylinders. Method 600 proceeds to exit.

At 630, method 600 adjusts the total number of active cylinder and the total number of activated cylinder modes in response to driver demand torque and engine speed. The driver demand torque may be determined from accelerator pedal position and vehicle speed. For example, accelerator pedal position and vehicle speed may be input to a function or table that outputs an empirically determined driver demand torque. In one example, the actual total number of active cylinders and activated cylinder modes is determined from a table that has driver demand torque and engine speed as inputs. Method 600 proceeds to 632.

At 632, method 600 adjusts torque converter slip responsive to driver demand torque and vehicle speed. In one example, method 600 references or indexes a table or function that outputs a desired torque converter slip responsive to driver demand torque and vehicle speed. The torque converter slip is adjusted via applying and releasing a torque converter clutch. Method 600 proceeds to exit.

In this way, the actual total number of activated engine cylinders and torque converter slip may be adjusted responsive to road conditions, fuel economy benefits of operating an engine with fewer than a full complement of engine cylinders, and fuel economy penalties of operating a driveline with a slipping torque converter.

Thus, the method of FIG. 6 provides for an engine control method, comprising: increasing an actual total number of operating cylinders from a first actual total number of operating cylinders to a second actual total number of operating cylinders via a controller in response to slip of a torque converter exceeding a threshold, the threshold a function of a fuel benefit and a fuel penalty. The method includes where the fuel benefit is an engine fuel consumption reduction provided via operating an engine with the first actual total number of operating cylinders. The method includes where the fuel penalty is an engine fuel consumption increase provided via operating the engine when a torque converter slip amount is greater than a threshold when the engine is providing a desired torque. The method includes where the operating cylinders are combusting air and fuel.

In some examples, the method further comprises adjusting torque converter slip in response to increasing the actual total number of operating cylinders. The method includes where adjusting torque converter slip includes decreasing torque converter slip. The method includes where decreasing torque converter slip includes increasing a closing amount of a torque converter clutch.

The method of FIG. 6 also provides for an engine control method, comprising: increasing an actual total number of operating cylinders from a first actual total number of operating cylinders to a second actual total number of operating cylinders via a controller in response to slip of a torque converter exceeding a threshold, the threshold a function of engine fuel economy and the actual total number of operating cylinders. The method further comprises adjusting an amount of torque converter slip and increasing an actual total number of available cylinder modes from the first actual total number of available cylinder modes to the second actual total number of available cylinder modes in response to changing from a first suspension control mode to a second suspension control mode. The method includes where the first suspension mode includes a higher dampening ratio than the second suspension mode. The method includes where the threshold further corresponds to an amount of vehicle vibration. The method includes where the first actual total number of operating cylinders is less than the second actual total number of operating cylinders.

In some examples, the method further comprises adjusting the slip of the torque converter in response to a frequency and amplitude of vertical acceleration of an unsprung suspension component. The method further comprises decreasing the actual total number of operating cylinders from the second actual total number of operating cylinders to the first actual total number of operating cylinders via the controller in response to slip of the torque converter being less than the threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
operating with a first actual total number of operating cylinders;
determining a torque converter slip;
increasing an actual total number of operating cylinders from a first actual total number of operating cylinders to a second actual total number of operating cylinders via a controller signaling a fuel pulse width to a fuel injector if the torque converter slip exceeds a threshold to decrease noise, vibration, and harshness (NVH), the threshold a function of a fuel benefit and a fuel penalty; and
operating with the second actual total number of operating cylinders.

2. The method of claim 1, where the fuel benefit is an engine fuel consumption reduction provided via operating an engine with the first actual total number of operating cylinders.

3. The method of claim 2, where the fuel penalty is an engine fuel consumption increase provided via operating the engine when the torque converter slip amount is greater than the threshold when the engine is providing a desired torque.

4. The method of claim 1, where the operating cylinders are combusting air and fuel.

5. The method of claim 1, further comprising adjusting torque converter slip in response to increasing the actual total number of operating cylinders.

6. The method of claim 5, where adjusting torque converter slip includes decreasing torque converter slip.

7. The method of claim 6, where decreasing torque converter slip includes increasing a closing amount of a torque converter clutch.

8. A vehicle system, comprising:
   an accelerometer coupled to a sprung mass of a vehicle;
   an engine coupled to the vehicle; and
   a controller including executable instructions stored in non-transitory memory to:
   determine a frequency and a power of a vertical acceleration of a mass of a vehicle's suspension via the accelerometer; and
   adjust slip of a torque converter in response to a frequency of vertical acceleration of a mass of a vehicle's suspension and a power of vertical acceleration of the mass of the vehicle's suspension via increasing a total number of operating cylinders.

9. The system of claim 8, where adjusting slip of the torque converter includes at least partially releasing a torque converter clutch.

10. The system of claim 8, where adjusting slip of the torque converter includes at least partially closing a torque converter clutch.

11. The system of claim 10, where the accelerometer is coupled to an unsprung vehicle suspension component.

12. The system of claim 8, further comprising additional instructions to adjust an actual total number of operating cylinders in response to the frequency of vertical acceleration of the mass.

13. The system of claim 8, where adjusting slip of the torque converter in response to the frequency includes decreasing slip of the torque converter in response to the frequency increasing.

* * * * *